Oct. 21, 1952　　　　J. J. DI IENNO　　　2,614,625
TILT MECHANISM FOR VENETIAN BLINDS
Filed Dec. 18, 1950
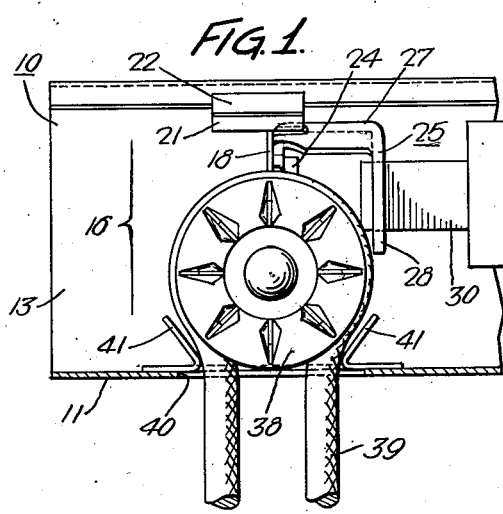
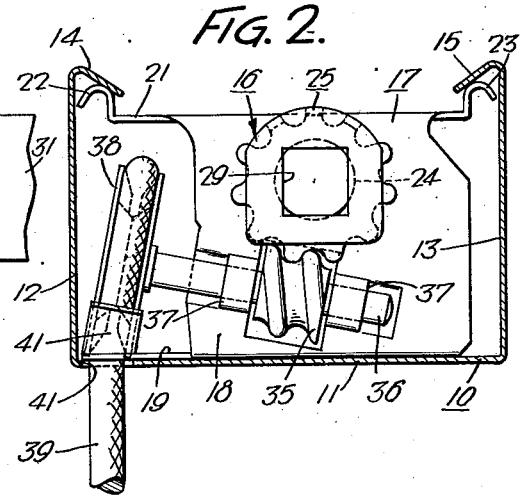
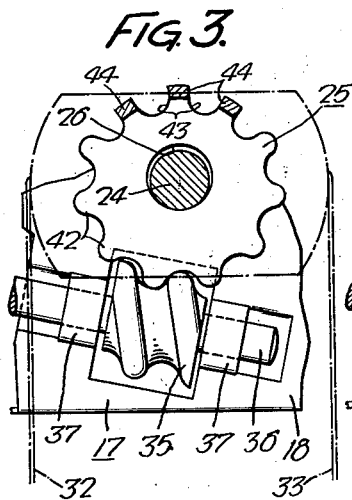
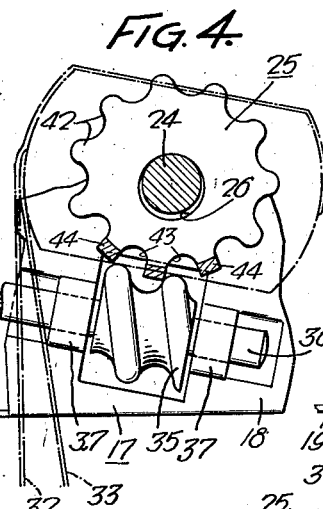
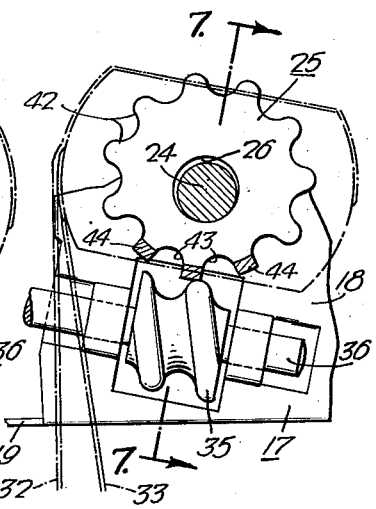
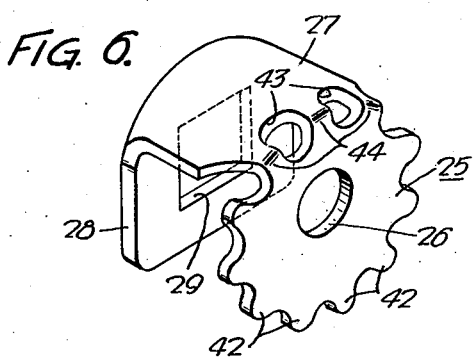
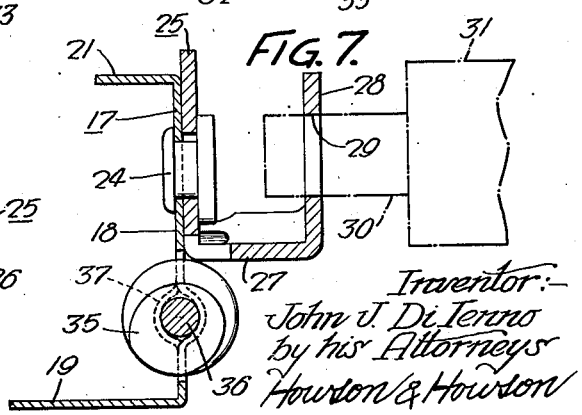
Inventor:—
John J. Di Ienno
by his Attorneys
Howson & Howson Patented Oct. 21, 1952

2,614,625

UNITED STATES PATENT OFFICE 2,614,625

TILT MECHANISM FOR VENETIAN BLINDS

John J. Di Ienno, Philadelphia, Pa., assignor to Carey-McFall Company, Philadelphia, Pa., a corporation of Pennsylvania Application December 18, 1950, Serial No. 201,288

2 Claims. (Cl. 160—176)

1

The present invention relates to new and useful improvements in tilt mechanism for Venetian blinds, and more particularly to new and useful improvements in tilt mechanisms wherein means are provided to allow the tilt cord to be easily repositioned or re-located on the rope sheave.

The tilt mechanism of a Venetian blind comprises generally a worm wheel and a gear associated with the tilt shaft and driven by the worm wheel which in turn is rotated by means of a cord operated pulley. Usually the cord passes over the pulley and has its two ends hanging free so that they may be grasped by the operator. When the Venetian blind is in use, the tilt cord inadvertently slips in one direction or the other over the pulley until, after repeated manipulations of the blind, the tilt cord is not centrally located on the pulley. Accordingly it becomes necessary periodically to re-locate the tilt cord upon the pulley. This may be done by manually threading the tilt cord about the pulley, a difficult and tedious operation, or by disengaging the gear from the worm wheel so that the latter may be rotated freely relative to the gear, for example, by eliminating entirely a portion of the teeth on the gear segment so that in at least one position the gear and worm are out of mesh, a construction which may jam when the gear is returned into engagement with the worm.

With the foregoing in mind, a principal object of the present invention is to provide a tilt mechanism for Venetian blinds embodying a novel construction and arrangement of the gear and worm wheel to permit rotation of the latter with respect to the gear without complete disengagement between them.

Another object of the present invention is to provide a novel Venetian blind tilt mechanism of the stated character which is constructed to permit the tilt cord to be easily positioned centrally with respect to the pulley without disengaging the worm and the gear.

A further object of the present invention is to provide a novel Venetian blind tilt mechanism wherein the gear is displaceable with respect to the worm wheel and in at least one position of the Venetian blind may be displaced in order to allow rotation of the worm wheel with respect to the gear.

A still further object of the present invention is to provide a novel Venetian blind tilt mechanism having the features and characteristics set forth which may be manufactured easily

2 and cheaply and which is entirely efficient and effective in operation and use.

These and other objects of the present invention and the various features and details of the operation and construction thereof are hereinafter more fully set forth and described with reference to the accompanying drawing in which:

Fig. 1 is a fragmentary side elevational view of the tilt mechanism for a Venetian blind;

Fig. 2 is an end elevational view of the tilt mechanism of the present invention installed in the head casing of a Venetian blind;

Fig. 3 is as enlarged sectional view showing the position of the gear and worm when the Venetian blind slats are in their horizontal position;

Fig. 4 is an enlarged sectional view showing the position of the gear and worm when the Venetian blind slats are in their extreme tilted position;

Fig. 5 is an enlarged sectional view illustrating the upward displacement of the gear with respect to the worm wheel thereby allowing the worm wheel to be rotated without simultaneously rotating the gear;

Fig. 6 is a perspective view of the gear element for the present invention blind tilt mechanism; and, Fig. 7 is a longitudinal sectional view taken on line 7—7 Fig. 5.

Referring more specifically to the drawing, reference numeral 10 designates generally the head casing for a Venetian blind. The casing 10 comprises a base portion 11 and relatively vertical side wall portions 12 and 13 which terminate at their upper ends in longitudinal channels 14 and 15 respectively. These channels 14 and 15, aside from stiffening the head casing 10 also serve to secure the various component parts of the Venetian blind to the head casing.

In accordance with the present invention, the tilt mechanism designated generally at 16 comprises a cross frame member 17. In the illustrated embodiment of the invention, the cross frame member 17 is formed of a plate 18 having a foot flange 19 resting on and secured to the bottom panel 11 of the head casing 10. The plate 18 is also provided with an upper flange 21 terminating in vertical projections or ears 22 and 23. These ears 22 and 23 extend into the longitudinal casing channels 14 and 15 respectively at the upper edges of the front channel 12 and rear channel 13, and impart rigidity to the head casing.

The plate 18 has secured therein a rivet or stud 24 on which a gear 25 is rotationally mounted. The stud 24 passes through an enlarged eccentric opening 26 in the gear 25 to allow the gear 25 relative transverse movement with respect to the plate 18 as more fully described hereinafter. Formed as an integral part of the gear 25 and extending outwardly therefrom is an axial extension 27 which terminates in an arm 28 that is disposed in a plane parallel to the plane of the gear 25 and spaced axially therefrom. A rectangular opening 29 is provided centrally in the arm 28 and is adapted to receive a correspondingly shaped tilt shaft 30 of the Venetian blind, which in turn carries the tilt bar 31 and the Venetian blind tapes 32 and 33.

A worm wheel 35 is secured upon a shaft 36 rotatably mounted in the plate 18 as indicated at 37 directly beneath the gear 25. Fixedly secured to the outwardly extending end of the shaft 36 is a notched or serrated pulley 38 about which passes the customary tilt cord or rope 39. The cord 39 is directed downwardly through an opening 40 on the bottom panel 11 of the head casing 10 by means of guides 41 formed as an integral part of the lower plate flange 19.

The gear 25 is provided with a plurality of teeth 42 which are adapted to engage the worm 35 so that rotation of the latter by pulling the tilt cord 39 operates to rotate the gear 25 and thereby change the angle of disposition of the Venetian blind slats. In accordance with the present invention, and with reference particularly to Fig. 6, the teeth 42 are arranged in substantially equal spaced relation about the gear 25 except at the junction with the axial extension 27. In order to provide teeth at this place and to maintain a continuity in the teeth around the entire periphery of the gear 25 openings are provided at the junction as indicated at 43. The openings 43 are so positioned that the metal between them is substantially the same width as that of the teeth 42 and disposed in the same spaced relation as the teeth 42 thus effectively providing teeth 44 at the junction of the gear 25 with the axial extension 27 for engagement with the worm 35.

As previously described, the opening 26 in the gear 25 is larger than the diameter of the stud 24, thereby allowing relative transverse movement of the gear 25 with respect to the plate 18 and the worm 35. Also, the opening 26 is positioned eccentrically in the gear 25 so that when the Venetian blind slats are in the horizontal position which corresponds to the gear position illustrated in Fig. 3, the teeth 42 of the gear 25 are in full engagement with the worm 35 and the lower side of the opening 26 bears against the stud 24. As the Venetian blind slats are tilted by rotation of the gear 25 the teeth thereon are gradually withdrawn from full engagement with the worm 25 due to the eccentricity of the opening 26 in the gear 25 until when the slats are in their extreme tilted position which corresponds to the position of the gear as shown in Fig. 4 the teeth 43 on the gear 25 are only in partial engagement with the worm wheel 35. In this position the upper portion of the opening 26 bears against the stud 24.

When it is desired to relocate the tilt cord 39 with respect to the pulley 38, it is merely necessary to tilt the Venetian blind slats to the proper limit position, for example as indicated at Fig. 4, and then continue to exert a substantial pull on the short end of the tilt cord. Since the tilt rod 30 can not be rotated any further, continued pressure of the worm 35 against the teeth 44 causes the gear 25 to be displaced upwardly with respect to the worm 35 as illustrated in Fig. 5. By this construction the teeth 44 of the gear 25 are carried upwardly by the worm 35 and ride over the convolutions thereof thus allowing the worm to be rotated until the tilt cord 39 is properly relocated on the pulley 38.

From the foregoing, it will be observed that the present invention provides a novel Venetian blind tilt mechanism embodying a novel construction and arrangement of gear and worm to permit rotation of the latter with respect to the gear without complete disengagement of the gear and worm. Furthermore, the present invention provides a novel Venetian blind tilt mechanism which is constructed to permit the tilt cord to be easily positioned centrally with respect to the pulley without disengagement of the worm and gear.

While a certain embodiment of the present invention has been illustrated and described herein, it is not intended to limit the invention to such disclosure and changes and modifications may be incorporated and embodied therein within the scope of the following claims.

I claim:

1. In tilt mechanism for a Venetian blind having the usual tilt shaft for angularly positioning the slats of the blind, a rotatably mounted worm, a tilt cord connected to said worm for rotationally actuating the latter, a member including a gear portion meshed with said worm and having a lateral extension from a peripheral part of the gear terminating outwardly in an arm disposed parallel to said gear portion and to which said tilt shaft is connected so that rotation of the gear by the worm operates normally to impart a corresponding rotation to the tilt shaft, said member gear portion having teeth extending circumferentially thereof from one side of the said lateral extension continuously to the other side thereof and said member having openings in the junction portion of the member between the gear and lateral extension to provide gear teeth along said junction and thereby a continuous series of teeth entirely circumferentially of the said gear portion, and means mounting said gear for limited radial movement toward and away from the worm in the limit tilt positions only of the blind so that continued pull exerted on the tilt cord in said limit positions operates to displace the gear outwardly from the worm and cause the worm to ride over the teeth of the gear thereby causing rotation of the worm relative to the gear to effect repositioning of the tilt cord.

2. In tilt mechanism for a Venetian blind having the usual tilt shaft for angularly positioning the slats of the blind, a rotatably mounted worm, a tilt cord connected to said worm for rotationally actuating the latter, a member including a gear portion normally meshed with said worm and having a lateral extension from a peripheral part of the gear terminating outwardly in an arm disposed parallel to said gear portion and to which said tilt shaft is connected so that rotation of the gear by the worm operates normally to impart a corresponding rotation to the tilt shaft, said member gear portion having teeth extending circumferentially thereof from one side of the said lateral ex tension continuously to the other side thereof and said member having openings in the junction portion of the member between the gear and lateral extension to provide gear teeth along said junction and thereby a continuous series of teeth entirely circumferentially of the said gear portion, and means eccentrically mounting said gear so that in the limit tilt positions of the blind the gear teeth mesh with the worm to a lesser depth than in the other tilt positions of the blind, said means also mounting said gear for limited radial movement toward and away from the worm in the limit tilt positions only of the blind so that continued pull exerted on the tilt cord in said limit positions operates to displace the gear outwardly from the worm and cause the worm to ride over the teeth of the gear thereby causing rotation of the worm relative to the gear to effect repositioning of the tilt cord.

JOHN J. DI IENNO.

REFERENCES CITED

The following references are of record in the file of this patent:

UNITED STATES PATENTS

| Number | Name | Date |
|---|---|---|
| 2,174,994 | Nelson | Oct. 3, 1939 |
| 2,224,712 | Balthasar | Dec. 10, 1940 |
| 2,282,272 | Waltzinger | May 5, 1942 |
| 2,580,479 | Strogran | Jan. 1, 1952 |